(12) United States Patent
McCabe

(10) Patent No.: US 7,992,686 B2
(45) Date of Patent: Aug. 9, 2011

(54) PALLET COUNTER FOR LIFT TRUCK

(75) Inventor: Paul Patrick McCabe, Binghamton, NY (US)

(73) Assignee: The Raymond Corporation, Greene, NY (US)

( * ) Notice: Subject to any disclaimer, the term of this patent is extended or adjusted under 35 U.S.C. 154(b) by 505 days.

(21) Appl. No.: 12/170,622

(22) Filed: Jul. 10, 2008

(65) Prior Publication Data

US 2010/0006377 A1 Jan. 14, 2010

(51) Int. Cl.
*B66F 9/06* (2006.01)

(52) U.S. Cl. .......................... 187/224; 414/695; 701/50

(58) Field of Classification Search .......... 187/222–224, 187/233, 277, 391–394; 701/23, 29, 50; 414/592, 610–613, 675; 212/282, 283; 340/568.1, 340/572.1–572.4; 177/139

See application file for complete search history.

(56) References Cited

U.S. PATENT DOCUMENTS

| | | | |
|---|---|---|---|
| 3,986,621 A | 10/1976 | Bowser | |
| 4,390,075 A | 6/1983 | Snead | |
| 4,499,541 A | 2/1985 | Yuki et al. | |
| 4,517,645 A | 5/1985 | Yuki et al. | |
| 4,520,443 A * | 5/1985 | Yuki et al. | 701/50 |
| 4,942,529 A | 7/1990 | Avitan et al. | |
| 4,949,263 A | 8/1990 | Jurca | |
| 5,105,896 A * | 4/1992 | Kyrtsos | 177/139 |
| 5,791,440 A | 8/1998 | Lonzinski et al. | |
| 5,934,864 A | 8/1999 | Lyon et al. | |
| 6,047,229 A * | 4/2000 | Ishikawa | 701/50 |
| 6,135,694 A | 10/2000 | Trego et al. | |
| 6,256,566 B1 * | 7/2001 | Kamiya et al. | 701/50 |
| 6,600,418 B2 | 7/2003 | Francis et al. | |
| 6,611,746 B1 * | 8/2003 | Nagai | 701/50 |
| 6,701,563 B2 | 3/2004 | Schomaker et al. | |
| 6,719,098 B1 * | 4/2004 | Ishikawa et al. | 187/222 |
| 6,868,574 B2 | 3/2005 | Schomaker et al. | |
| 6,871,210 B1 | 3/2005 | Subramanian | |
| 6,929,440 B1 | 8/2005 | Grond | |
| 7,010,404 B2 * | 3/2006 | Ichijo et al. | 701/50 |
| 7,219,769 B2 * | 5/2007 | Yamanouchi et al. | 187/227 |
| 7,320,385 B2 * | 1/2008 | Katae et al. | 187/227 |
| 7,475,753 B2 * | 1/2009 | Oka et al. | 180/306 |
| 7,524,268 B2 * | 4/2009 | Oka et al. | 477/169 |
| 7,735,609 B2 * | 6/2010 | Ito et al. | 187/277 |
| 2007/0080025 A1 * | 4/2007 | Yamada et al. | 187/224 |
| 2007/0198157 A1 * | 8/2007 | Righi | 701/50 |
| 2007/0208476 A1 | 9/2007 | Baginski | |
| 2009/0265059 A1 * | 10/2009 | Medwin et al. | 701/33 |
| 2010/0127870 A1 * | 5/2010 | Rinkes et al. | 340/572.1 |

FOREIGN PATENT DOCUMENTS

| | | |
|---|---|---|
| EP | 0 200 039 A | 11/1986 |
| EP | 0 795 514 A | 9/1997 |
| EP | 1 770 613 A | 4/2007 |
| WO | 02/068310 A | 9/2002 |

* cited by examiner

*Primary Examiner* — Jonathan Salata

(74) *Attorney, Agent, or Firm* — Quarles & Brady LLP

(57) ABSTRACT

A method for counting the pallets or loads moved by a lift truck using internal sensors is disclosed. The lift truck includes a weight sensor for weighing a load, a height sensor, for measuring a height of the forks, and a distance sensor for determining whether the vehicle has moved. When the data from each of these sensors exceeds a corresponding minimum value, a vehicle control system increments a pallet counter. A count of the number of pallets moved is therefore maintained without the need for tracking specific pallets of for adding expensive components and devices.

24 Claims, 4 Drawing Sheets

PALLET COUNTER FOR LIFT TRUCK

CROSS-REFERENCE TO RELATED APPLICATION

Not applicable.

STATEMENT CONCERNING FEDERALLY SPONSORED RESEARCH OR DEVELOPMENT

Not applicable.

FIELD OF THE INVENTION

The present invention relates to lift trucks, and more specifically to a method and apparatus for determining a number of pallets or loads that have been moved by an operator.

BACKGROUND OF THE INVENTION

In warehousing applications and particularly stock picking or order filling operations, it is generally desirable to move as much stock as possible, in as little time as possible, such that stock can be delivered with a high degree of efficiency. To help to assure that these goals are met, it is desirable to monitor the number of pallet loads that are moved by an operator during a predefined period of time, such as an operator's shift.

One known method for monitoring pallet loads has been to require the operator or a supervisor to manually keep records of load movement. These records could then be used to determine an operator's productivity level, to determine when truck maintenance was required, and to determine when lease and rental fees were due. While providing the required information, however, manual record-keeping interferes with the efficiency of a warehousing operation either by disrupting the operator, and preventing the operator from delivering goods, or requiring additional personnel to monitor load movement.

Another known method for tracking pallet loads is through the use of computerized systems. These systems are typically add-on devices that are installed on a vehicle, and typically use bar code scanners or RFID scanners to monitor the movement of pallets. These devices, again, are useful in monitoring pallets, but can decrease efficiency because they require scanning, which disrupts the operator from his or her main task of stock picking or order filling. Additionally, these devices can be expensive, requiring not only specialized equipment for the vehicle, but also marking of the pallets with bar codes, RFID tags, or other identifying devices.

Therefore, while methods are known for tracking and counting pallet movement, these methods typically decrease the efficiency of the driver or are otherwise expensive to implement. The present invention addresses these issues.

SUMMARY OF THE INVENTION

In one aspect of the invention, a lift truck is provided. The lift truck includes an power unit, and a fork moveably coupled to the power unit. A weight sensor is coupled to the fork for producing a weight control signal indicative of a weight of a load provided on the fork, and a height sensor is coupled to the mast for producing a height control signal indicative of a height of the fork. A wheel and associated traction motor are coupled to the operator station, and a distance sensor is coupled to the traction motor for providing a distance control signal indicative of a distance traveled by the vehicle. A vehicle control system is provided in the lift truck in communication with the weight sensor, the height sensor, and the distance sensor, and is programmed to receive the weight control signal, the height control signal, and the distance control signal. The vehicle control system determines whether a load has been moved based on the weight control signal, the height control signal, and the distance control signal and increment, a pallet count when the vehicle control system determines that a pallet has been moved.

In another aspect of the invention, the vehicle control system is further programmed to compare the weight control signal, the height control signal, and the distance control signal to a minimum load weight, a minimum travel distance, and a minimum load height, respectively, and to increment the pallet count when the weight control signal, the height control signal, and the distance control signal exceed the corresponding minimum load weight, minimum travel distance, and minimum load height.

In still another aspect of the invention, the vehicle control system is further programmed to monitor a clock signal and to calculate a time period associated with the pallet count. The vehicle control system can also be programmed to calculate a number of pallets moved over a predetermined period as a function of the pallet count and the time period. The calculated number can be, for example, an average number of pallets moved over a predetermined period of time.

In yet another aspect of the invention a scanning device is coupled to the vehicle control system, and is programmed to read an identifier associated with a load to be moved. The identifier can be compared against a list of loads to be moved by the operator which is stored in memory. Alternatively, the identifying data can be stored to provide a record of the loads moved. The identifying data can also be associated with a time stamp for tracking or other purposes.

In another aspect of the invention, a user input is provided in communication with the vehicle control system, and the vehicle control system is further programmed to receive the minimum load weight, the minimum travel distance, and the minimum load height from the operator, and to store the minimum load weight, the minimum travel distance, and the minimum load height in memory, thereby allowing a user to customize the criteria for determining when a pallet is moved.

In another aspect of the invention, a method for determining an efficiency of an operator driving a lift truck having a fork mounted to a mast for moving pallets is disclosed. The method comprises determining a weight of a pallet on the fork, determining a height of the fork, and determining a distance traveled by the lift truck. The weight of the load, the height of the fork, and the distance traveled are then compared to a minimum weight, height, and distance, respectively, and a pallet counter is incremented when the weight of the load, the height of the fork, and the distance traveled exceed the corresponding minimum weight, height, and distance, respectively.

These and other aspects of the invention will become apparent from the following description. In the description, reference is made to the accompanying drawings which form a part hereof, and in which there is shown a preferred embodiment of the invention. Such embodiment does not necessarily represent the full scope of the invention and reference is made therefore, to the claims herein for interpreting the scope of the invention.

DETAILED DESCRIPTION OF THE PREFERRED EMBODIMENT

Figure 1:
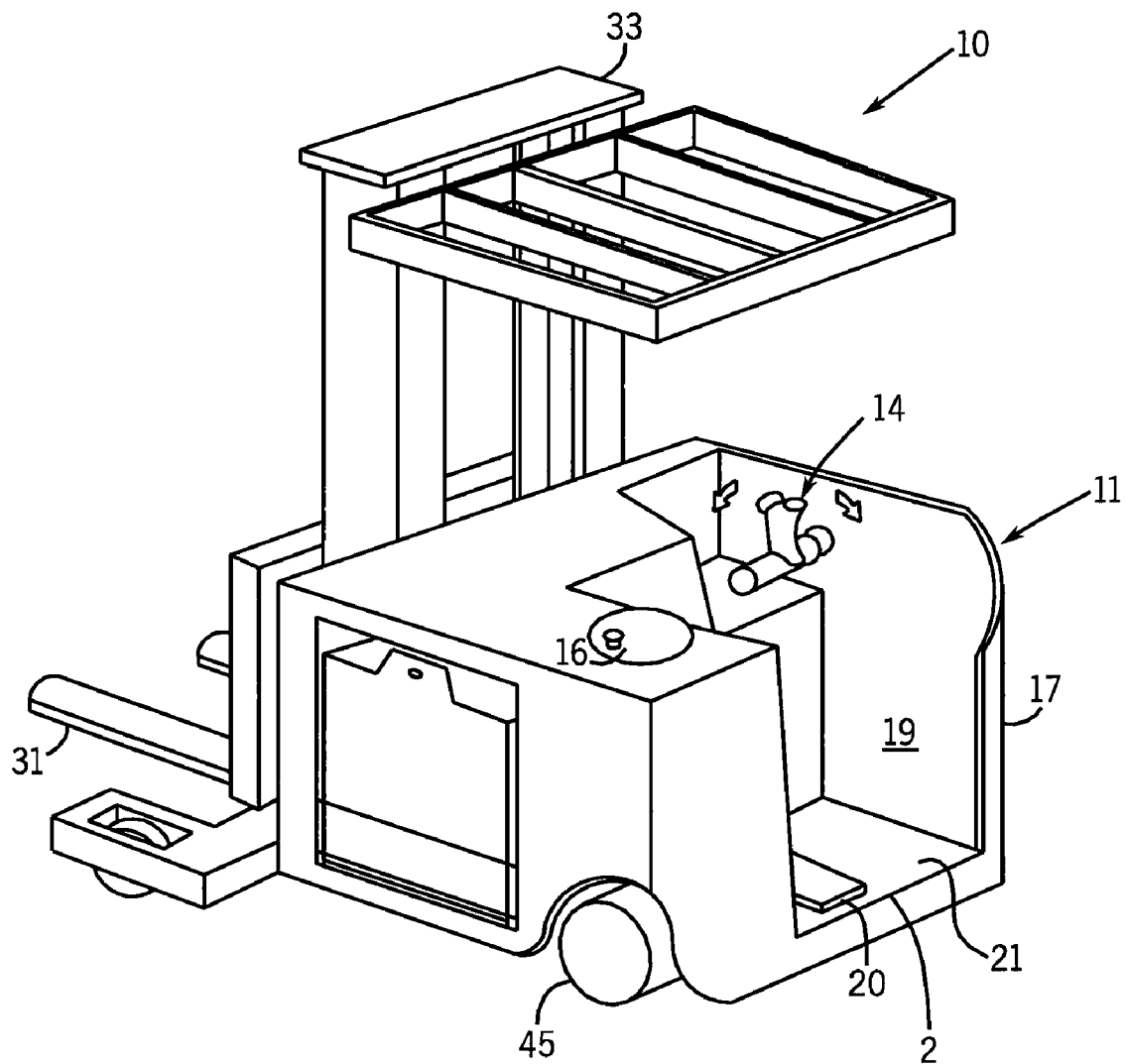
FIG. 1 is a perspective view of a lift truck that can include the pallet counter system constructed in accordance with the present invention.

Referring now to the Figures, and more particularly to FIG. 1, a material handling vehicle or lift truck 10 constructed in accordance with the present invention is shown. The material handling vehicle 10 includes a power unit 11 including an operator compartment 11 comprising an enclosure 17 with an opening 19 for entry and exit of the operator. The power unit 11 include a control handle 14 which is mounted to the enclosure 17 at the front of the power unit 11 proximate the forks 31, and a floor switch 20 positioned on the floor 21 of the power unit 11. A steering wheel 16 is also provided in the power unit 11. Although the material handling vehicle 10 as shown by way of example as a standing, fore-aft stance operator configuration lift truck, it will be apparent to those of skill in the art that the present invention is not limited to vehicles of this type, and can also be provided in various other types of material handling and lift truck configurations. Furthermore, although the pallet count system of the present invention is described and shown in conjunction with a reach truck, it will be apparent that the present invention can be implemented on any lift truck vehicle that includes a fork intended for moving pallets and loads of material. For example, the present invention can also be used on pallet trucks, counter-balanced fork lifts, order pickers, swing reach vehicles, and other types of material handling vehicles.

Figure 2:
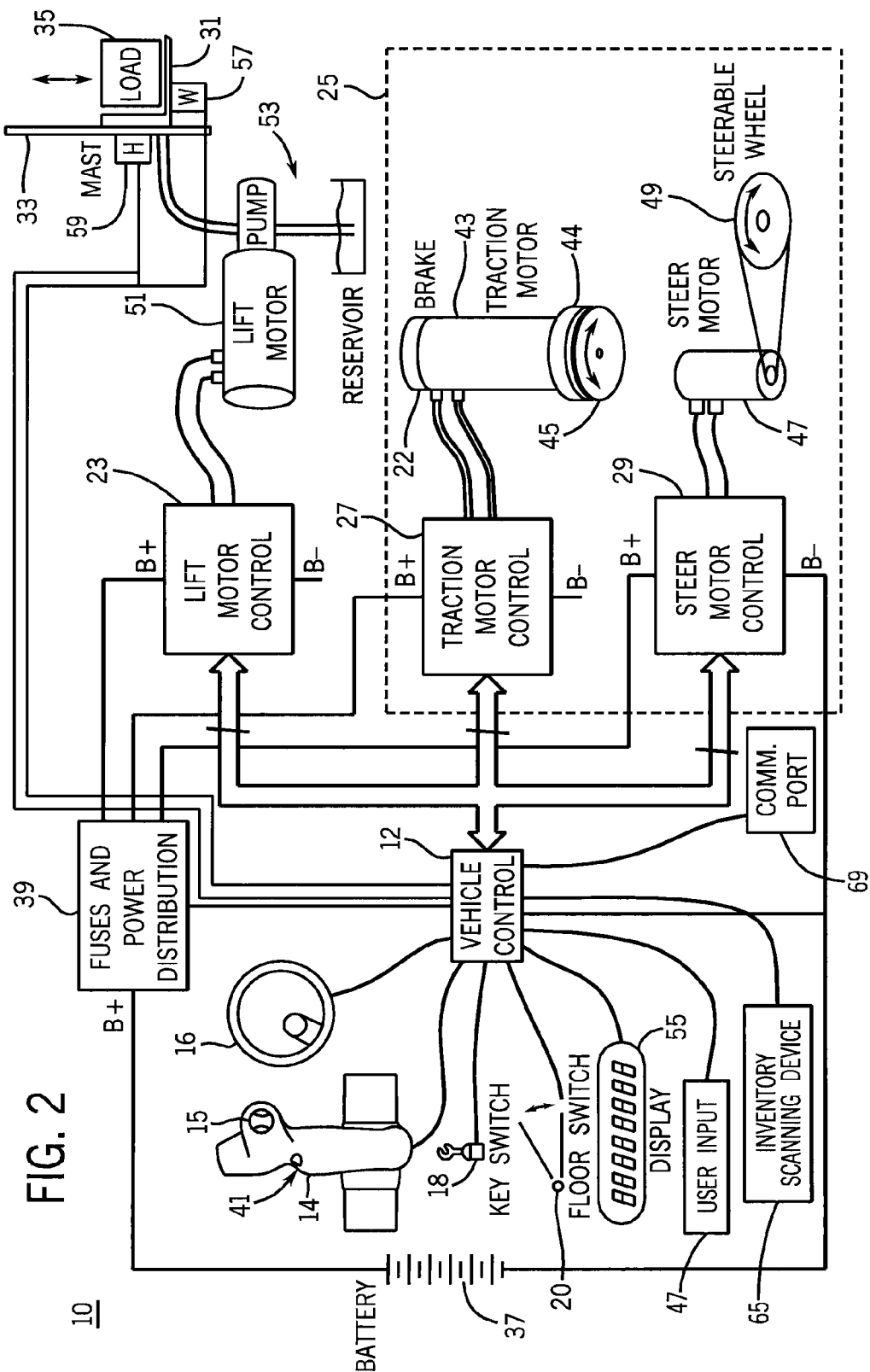
FIG. 2 is a block diagram of a control system of the lift truck of FIG. 1.

Referring now to FIG. 2, a block diagram of a control system for a typical lift truck 10 in which the present invention can be provided is illustrated. The lift truck 10 comprises a vehicle control system 12 which receives operator input signals from the operator control handle 14, the steering wheel 16, a key switch 18, and the floor switch 20 and, based on the received signals, provides command signals to each of a lift motor control 23 and a drive system 25 including both a traction motor control 27 and a steer motor control 29. The drive system 25 provides a motive force for driving the lift truck 10 in a selected direction, while the lift motor control 23 drives forks 31 along a mast 33 to raise or lower a load 35, as described below. The lift truck 10 and vehicle control system 12 are powered by one or more battery 37, coupled to the vehicle control system 12, drive system 25, steer motor control 29, and lift motor control 23 through a bank of fuses or circuit breakers 39.

As noted above, the operator inputs include a key switch 18, floor switch 20, steering wheel 16, and an operator control handle 14. The key switch 18 is activated to apply power to the vehicle control system 12, thereby enabling the lift truck 10. The floor switch 20 provides a signal to the vehicle control system 12 for operating the brake 22 to provide a deadman braking device, disabling motion of the vehicle unless the floor switch 20 is activated by the operator.

The operator control handle 14 provides a travel request signal to the vehicle control system 12. Typically, the handle 14 is rotated in a vertical plane to provide a travel direction and speed command of motion for the lift truck 10. A four-way switch 15 located on the top of the handle 14 provides a tilt up/down function when activated in the forward and reverse directions and a sideshift right and left function when activated to the right and left directions. A plurality of control actuators 41 located on the handle 14 provide a number of additional functions, and can include, for example, a reach push button, a retract push button, and a horn push button as well as a potentiometer providing a lift function. A number of other functions could also be provided, depending on the construction and intended use of the lift truck 10.

The traction motor control 27 drives one or more traction motor 43 which is connected to wheel 45 to provide motive force to the lift truck. The speed and direction of the traction motor 43 and associated wheel is selected by the operator from the operator control handle 14, and is typically monitored and controlled through feedback provided by a speed/distance sensor 44 which can be an encoder or other feedback device coupled to the traction motor 43, and which can also be used to provide feedback for determining a distance traveled by the lift truck 10. The wheel 45 is also connected to friction brake 22 through the traction motor 43, to provide both a service and parking brake function for the lift truck 10. The friction brake 22 can be a spring-activated brake that defaults to a "brake on" position, such that the switch 20 and associated brake 22 therefore provide the deadman braking function. The operator must provide a signal indicating that the deadman brake is to be released to drive the truck, here provided by the floor switch 20, as described above. The traction motor 43 is typically an electric motor, and the associated friction brakes 22 can be either electrically operated or hydraulically operated devices. Although one friction brake 22, motor 43, and wheel 45 are shown, the lift truck 10 can include one or more of these elements.

The steer motor control 29 is connected to drive a steer motor 47 and associated steerable wheel 49 in a direction selected by the operator by rotating the steering wheel 16, described above. The direction of rotation of the steerable wheel 49 determines the direction of motion of the lift truck 10.

The lift motor control 33 provides command signals to control a lift motor 51 which is connected to a hydraulic circuit 53 for driving the forks 31 along the mast 33, thereby moving the load 35 up or down, depending on the direction selected at the control handle 14. In some applications, the mast 33 can be a telescoping mast. Here, additional hydraulic circuitry is provided to raise or lower the mast 33 as well as the forks 31. As shown here, a height sensor 59 is provided in the mast control system to provide a signal to the controller 12 indicating the height of the mast 33. The height sensor 59 can be, for example, an encoder, a flow sensor in the hydraulic system, a light beam, or other types of sensors. Similarly, a weight sensor 57 is provided on the forks 31. The weight sensor 57 can be, for example, a load cell, strain gauge, light beam or pressure sensor in the lift system and provides a signal to the controller 12 that indicates whether a load is on the forks, and a weight of the load.

In addition to providing control signals to the drive system and lift control system, the vehicle control 12 can also provide data to a display 55 for providing information to the operator. Information provided on the display 55 can include, for example, a number of pallets moved, a number of pallets moved over a period of time, an average number of pallets moved by the vehicle, a weight of a pallet or load placed on the forks 31, the speed of the vehicle, the time, or maintenance information.

Referring still to FIG. 2 a number of data input and output devices can also be coupled to the vehicle control system 12, including, for example, a user interface 67, an inventory scanning device 65, and a communications port 69. The user interface 67 allows the operator, a supervisor, or other personnel to enter data into the vehicle control 12, and can be implemented as a touch screen in display 55, or provided as a keyboard, a series of input keys, a mouse, joystick or other input devices as will be apparent to those of ordinary skill in the art. The inventory scanning device 65, can be, for example, a barcode reader, RFID reader, data entry pad, RuBee reader or other device capable of reading corresponding identifiers such as RFID tags, RuBee tages, barcodes or other symbols associated with a pallet or other load. The communications port 69 can be a parallel or serial communications link, an Ethernet or other network connection, TCP/IP port, wireless communications link or other device capable of downloading data to and from the vehicle control system 12.

Figure 3:
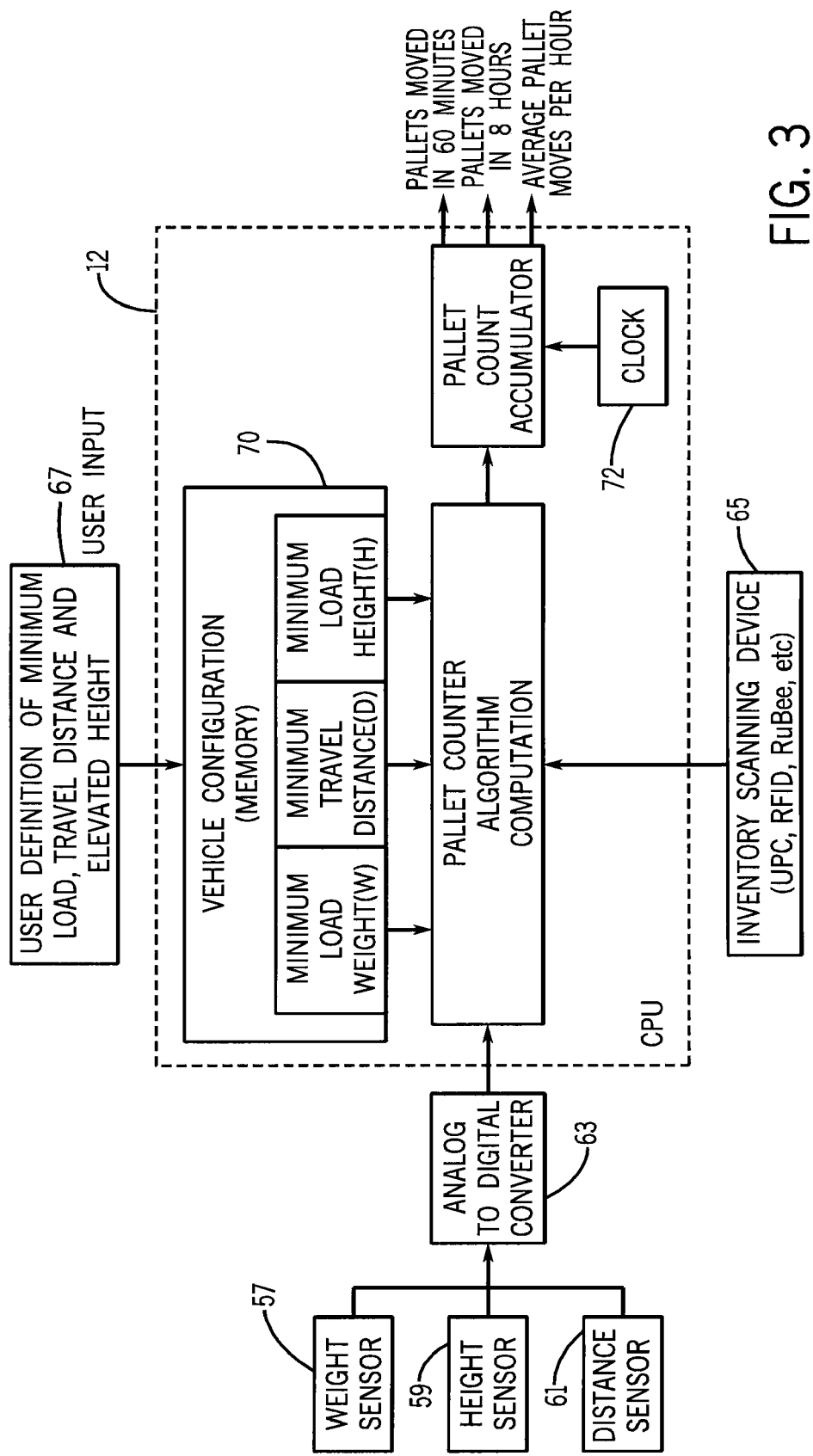
FIG. 3 is a simplified block diagram of the vehicle control system of FIG. 2 illustrating the use of the control system for pallet counting.

Referring now to FIG. 3, a simplified block diagram of the vehicle control system 12 as used for counting pallets is shown. As shown here, the vehicle control 12 includes a central processing unit, a memory component 70, and an internal clock 72. Software for calculating a number of loads or pallets moved by the lift truck 10 is stored in the memory 70. A user interface 67 can be coupled in communication with the vehicle control 12, as described above, and in particular, can be used by the operator to designate a minimum load, minimum travel distance, and minimum lift height required as comparators for determining when a pallet or load has been moved. Alternatively, or in addition to a user selected value, a pre-determined minimum load, travel distance and lift height can be established and stored in memory 70, where the data is easily accessed for use in computing the number of pallets moved.

As described above, the weight sensor 57, height sensor 59, and distance sensor 44 are each coupled to the vehicle control 12 to provide a control signal indicative of the weight of a load on the fork, the height of the load and forks on the mast and the distance that the vehicle has moved, respectively. The minimum weight, height, and distance values, and the corresponding control signals, are used to determine when a load has been placed on the forks 31, lifted by the forks 31, moved, and then lowered by the forks. As described above, minimum weight, height, and distance values can be stored in a memory component associated with the vehicle control 12. These values can be default values, or selected by a user through user interface 67.

In addition, data from the clock 72 can be used to establish time parameters to calculate efficiency rating, such as the number of pallets moved within a calculated time frame. During operation, identifying data associated with a load can be scanned by scanning device 65. The identifying data can be compared to a list of loads to be moved by the operator which is stored in memory, or can be individually stored to provide a record of the loads moved. The identifying data can also be associated with a time stamp for tracking or other purposes.

Figure 4:
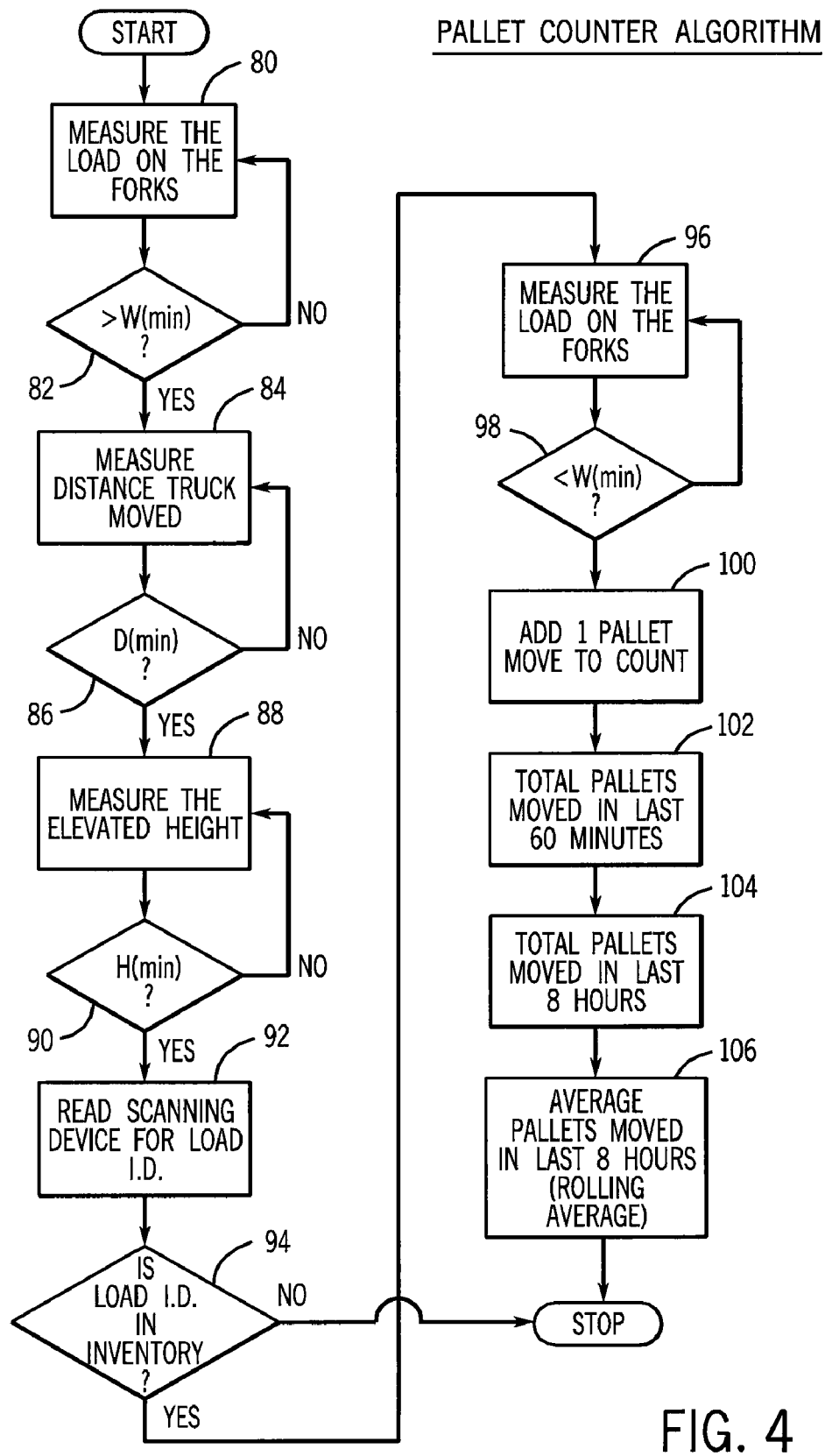
FIG. 4 is a flow chart illustrating one embodiment of a pallet counting process.

Referring now to FIG. 4, a process flow chart illustrating the steps associated with one method for counting pallets or loads moved by an operator of the lift truck 10 is shown, as executed in the in the vehicle control 12. Initially as described above, in process block 80, the weight sensor 57 (FIGS. 2 and 3) is monitored to determine whether a load or pallet has been lifted. At process block 82 the vehicle control 12 determines whether the weight exceeds the minimum weight stored in the memory 70 and, if not, the process returns to process block 80, and continues measuring the load on the forks until the weight does exceed the minimum. When the weight at weight sensor 57 does exceed the minimum weight stored in memory 70, the process moves to process block 84, where an analysis is done to determine if the lift truck 10 has moved and if so, what distance. This change in distance is determined by reference to the encoder 44 (FIG. 2) associated with traction motor as described above. Again, until the distance moved by the lift truck 10 exceeds the minimum distance, the process remains in a loop at process block 86. When the distance moved exceeds the minimum distance at process block 86, the height sensor 59 is monitored to determine the height of the forks along the mast 33 at process block 88. Again, the process remains in a loop between process blocks 88 and 90 until the change in height exceeds the minimum setting, either raised or lowered. Once the weight, height, and distance minimums have been exceeded, a load or pallet has been moved.

Once a determination has been made that a load has been moved, optionally, at process block 92, the scanning device 65 is read to identify the load. The identity of the load can then be verified, for example, against a warehousing list or other list providing the identities of pallets to be moved by the operator. This step is useful, for determining whether a load lifted by the lift truck 10 is a legitimate part of a load to be moved, an empty pallet, or another load that is not part of an approved listing of pallets to be moved, and can be used, for example, to prevent an operator from gaining efficiency credit while moving empty pallets, or for general maintenance, or other tasks. At process block 94, if the scanned load is not part of the inventory of interest, the process is stopped, and the load is not counted.

If the load is a legitimate load, or if no identification check is made, in process blocks 96 and 98, the weight sensor 57 is monitored to determine when the weight on the forks falls below the minimum value, thereby indicating that the load has been delivered. When a cycle is completed, e.g. a load of appropriate weight has been lifted above the predetermined minimum weight, has been moved beyond the minimum distance, and has been delivered or lowered, the pallet counter is incremented at process block 100.

Referring still to FIG. 4, when the pallet count is complete, the vehicle control 12 can determine an elapsed time period since the last move, or a current time, based on input from the clock 72. After a time is established, the vehicle control 12 can optionally, calculate one or more relationship associating pallets moved as a function of time. As shown here by way of example, at process block 102, the total number of loads moved in the last 60 minutes can be calculated. Additionally, or in the alternative, at process block 104, the number of total pallets moved within the last 8 hours can be calculated. As shown in process block 106, an average number of pallets moved in the last 8 hours can be provided. A rolling average can also be maintained. The data calculated in process blocks 100, 102, 104, and 106 can be used to analyze the efficiency of an operator driving the lift truck 10, to determine the efficiency of the lift truck 10, to schedule maintenance procedures for the lift truck 10, or to determine payments for leases based on number of pallets moved. Various other uses for the data acquired through the algorithm described above will be apparent to those of skill in the art. Although specific calculations are described here, it will be apparent that these calculations are examples, and that many statistical calculations could be made to evaluate an efficiency of an operator or the efficiency of the vehicle. Furthermore, the data acquired can be used to determine other parameters including lease payments, when maintenance needs to be performed on the vehicle, or various other vehicle use parameters.

As described above, the data acquired by the vehicle control system 12 can be displayed on display 55 in the lift truck 10, and/or downloaded or otherwise transmitted through communications port 69.

Although preferred embodiments have been shown and described, it will be apparent that various modifications can be made to the features described above. For example, although the process is described above as requiring monitoring of a weight, a height, and a distance traveled, it will be apparent to those of ordinary skill in the art that a determination as to whether a load or pallet has been moved could be made, albeit with less accuracy, as a function of a weight alone, a weight and a height measurement, a weight and a distance traveled, a weight and a time, or in various other ways. Furthermore, although a distance is described above, it will be apparent that the distance can either be an actual distance, or an indication of movement for a predetermined period of time. For example, an actual distance can be calculated based on encoder data in combination with wheel size. Alternatively, encoder feedback indicating that the traction motor 43 is active in combination with a time period can be used to determine the distance. The distance could therefore be specified in terms of length of travel, or time of motor activation.

Additionally, although the scanning system 65 is described above specifically for use in verifying picked stock against a listing of pallets to be moved, it will be apparent that scanned data can be used in various other ways. For example, the pallet identification can be associated with a time stamp from clock 72 to indicate when a specific pallet was moved. Various methods of using the scanned data will be apparent to those of ordinary skill in the art.

As discussed above, although the vehicle is shown and described specifically for use on a reach truck vehicle, it will be apparent that this description is not intended to limit the scope of the invention, and that the present invention can be used on various types of material handling vehicles. Furthermore, although a mast construction is shown and described, it will be apparent that other methods for raising and lowering a fork can also be used.

To apprise the public of the scope of this invention, the following claims are made:

I claim:

1. A lift truck, comprising:
   a power unit;
   a fork moveably coupled to the power unit;
   a weight sensor coupled to the fork for producing a weight control signal indicative of a weight of a load provided on the fork;
   a lift motor coupled to the fork for raising and lowering the fork;
   a height sensor coupled to the fork for producing a height control signal indicative of a height of the fork;
   a wheel coupled to the power unit;
   a distance sensor coupled to the wheel for providing a distance control signal indicative of a distance traveled; and
   a vehicle control system, the vehicle control system in communication with the weight sensor, the height sensor, and the distance sensor, wherein the vehicle control system is programmed to receive the weight control signal, the height control signal, and the distance control signal, and is programmed to determine whether a pallet has been moved based on the weight control signal, the height control signal, and the distance control signal, and to increment a pallet count.

2. The lift truck as defined in claim 1, wherein the vehicle control system is further programmed to compare the weight control signal, the height control signal, and the distance control signal to a minimum load weight, a minimum travel distance, and a minimum load height, respectively, and to increment the pallet count when the weight control signal, the height control signal, and the distance control signal exceed the corresponding minimum load weight, minimum travel distance, and minimum load height.

3. The lift truck as defined in claim 1, wherein the vehicle control system is further programmed to monitor a clock signal and to calculate a time period associated with the pallet count.

4. The lift truck as defined in claim 1, wherein the vehicle control system is further programmed to calculate a number of pallets moved for a predetermined period as a function of the pallet count and the time period.

5. The lift truck as defined in claim 4, wherein the vehicle control system is further programmed to calculate an average number of pallets moved over a predetermined period of time as a function of the pallet count and the time period.

6. The lift truck as defined in claim 1, further comprising a scanning device coupled to the vehicle control system, the scanning device being programmed to read an identifier associated with a pallet to be moved.

7. The lift truck as defined in claim 6, wherein the identifier is at least one of an active data tag and a passive data tag.

8. The lift truck as defined in claim 6, wherein the data tag is at least one of an RFID tag, a RuBee tag, or a barcode symbol.

9. The lift truck of claim 1, wherein the vehicle control system is further programmed to compare the identifier to a stored list to identify the load.

10. The lift truck of claim 1, further comprising a user input in communication with the vehicle control system, wherein the vehicle control system is further programmed to receive the minimum load weight, the minimum travel distance, and the minimum load height from the operator, and to store the minimum load weight, the minimum travel distance, and the minimum load height in memory.

11. The lift truck of claim 1, wherein the weight sensor is at least one of a load cell, a strain gauge, and a pressure sensor.

12. The lift truck of claim 1, wherein the height sensor is at least one of an encoder, a flow sensor, and a light beam.

13. The lift truck of claim 1, further comprising a display in communication with the vehicle control system, wherein the vehicle control system is programmed to selectively provide the pallet count on the display.

14. The lift truck of claim 1, further comprising at least one communications port coupled to the vehicle control system, the vehicle control system being further programmed to selectively communicate the pallet count and the time period through the communications port.

15. The lift truck of claim 1, further comprising a scanner in communication with the vehicle control system for scanning an identifier associated with the pallet, wherein the vehicle control system is programmed to compare the identifier against a listing of loads to be moved, and to increment the pallet counter only when the identifier matches the listing of loads.

16. The lift truck of claim 1, wherein the controller calculates the distance as a length of travel of the vehicle.

17. The lift truck of claim 1, wherein the controller calculates the distance as a function of traction motor activation and time.

18. A method for determining an efficiency of an operator driving a lift truck having a fork for moving pallets, the method comprising the following steps:
   determining a weight of a load on the fork;
   determining a height of the fork;
   determining a distance traveled by the lift truck;
   comparing each of the weight of the load, the height of the fork, and the distance traveled by the lift truck to a minimum weight, height, and distance, respectively; and incrementing a pallet counter when the weight of the load, the height of the fork, and the distance traveled exceed the corresponding minimum weight, height, and distance, respectively.

19. The method as recited in claim 18, further comprising the step of calculating a time period, and correlating the time period to the pallet count for the time period.

20. The method as recited in claim 18, further comprising the step of selectively providing at least one of the pallet count, the time period, and a pallet count as a function of the time period to a user.

21. The method as recited in claim 18, further comprising the step of identifying the pallet, comparing the identity of the pallet to a listing of loads to be moved, and incrementing the load count only if the load is part of the listing.

22. The method as recited in claim 18, further comprising the step of determining when the weight of the load on the truck falls below the minimum level indicating that the load has been removed, and incrementing the pallet count when the load has been removed.

23. The method as recited in claim 18, wherein the step of determining a distance traveled comprises calculating a time period during which a traction motor is active.

24. The method as recited in claim 18, wherein the step of determining a distance traveled comprises calculating a length of travel by the lift truck.

* * * * *